May 22, 1923.
S. WHITING
1,455,948
RESILIENT SUSPENSION DEVICE FOR THE FRONT WHEELS OF MOTOR CYCLES
Filed May 7, 1921
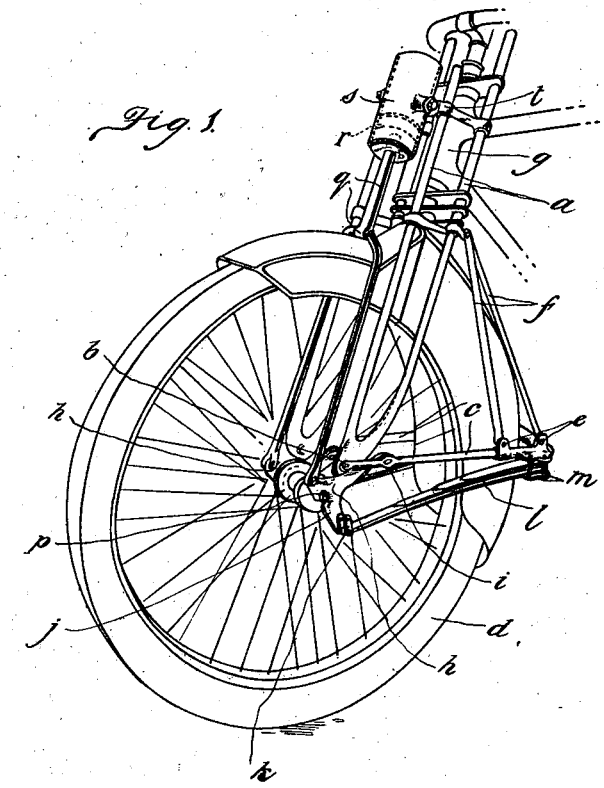
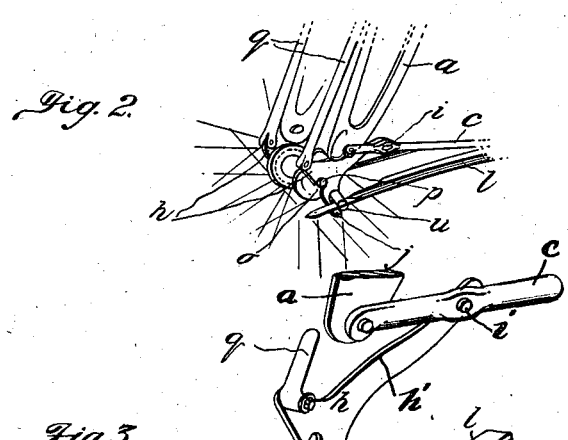
Inventor
S. Whiting,
By Marks & Clerk
Attys.

Patented May 22, 1923.

1,455,948

UNITED STATES PATENT OFFICE.

SAVILLE WHITING, OF MELBOURNE, VICTORIA, AUSTRALIA.

RESILIENT SUSPENSION DEVICE FOR THE FRONT WHEELS OF MOTOR CYCLES.

Application filed May 7, 1921. Serial No. 467,569.

*To all whom it may concern:*

Be it known that I, SAVILLE WHITING, of Oxford Chambers, Bourke Street, Melbourne, in the State of Victoria, Commonwealth of Australia, a subject of the King of England, have invented certain new and useful Improvements in Resilient Suspension Devices for the Front Wheels of Motor Cycles; and I do hereby declare the following to be a full, clear, and exact description of the invention, such as will enable others skilled in the art to which it appertains to make and use the same.

This invention relates to improvements in resilient suspension devices for the front wheels of motor cycles and refers especially to suspension devices wherein the wheel is movably connected to the front fork and laminated leaf springs and (or) cushioning devices are provided to absorb shock and jar incidental to the wheel passing over a rough road.

In the constructions at present in use in which laminated springs are adapted for absorbing the shock and jar of front wheels of motor cycles it is customary to provide a flat laminated spring above the wheel and connected to the fork carrying the wheel hub by vertical rods. This arrangement necessitates the employment of a comparatively short spring which is not very resilient in use.

The object of this invention is to provide certain improvements in the resilient suspension devices for the front wheels of motor cycles in which use is made of a twin or duplicated flat laminated spring of greater length than heretofore whereby increased resiliency is obtained and a construction accorded which is more efficient in use.

I accomplish the above mentioned object by mounting the ends of the axle of the front wheel removably in T-shaped or bell crank levers having their leg portions or one of their ends extending rearwardly and pivoted to the sides of a yoke shaped frame rigidly connected to the fork and passing around the back of the wheel and in providing a movable connections between the depending arms of the lever and the working ends of quarter-elliptic springs clamped to the sides of the said yoke shaped frame and in providing a rigid connection between the said lever and the piston of a dash pot or other cushioning device mounted on the front fork of the cycle above the wheel, the various parts constructed and arranged whereby when the front wheel is thrust upwardly by forcible contact with inequalities in the roadway, the levers will pivot on the yoke-shaped frame and pressure will be applied to the springs and to the cushioning device in an upward direction or in opposition to the tension on the same.

The invention consists in the features of novelty in the construction, combination and arrangement of the several parts generally shown in the accompanying drawings and described in the specification, but more particularly pointed out in the appended claims.

Figure 1 is a view in perspective showing one form of the invention applied to the front wheel of a cycle.

Figure 2 is a view in perspective showing a slight modification in the invention.

Figure 3 is a view in perspective of a constructional detail of that form of the invention shown in Figure 1 and hereinafter is fully described.

In these views the reference letter $a$ designates the front fork of the cycle the lower ends of which are connected by bolts $b$ or otherwise to the ends of a yoke-shaped frame $c$ which passes around the rear of the front wheel $d$. The sides of the yoke-shaped frame $c$ near its looped end are formed with a pair of lugs $e$ arranged one in advance of the other to which are connected the lower ends of stays $f$ having their opposite ends rigidly connected to the fork below or adjacent to the lower part of the head $g$ of the cycle frame. The fork $a$ and the yoke-shaped frame $c$ are shaped to provide ample room for a free play of the wheel in an upward direction and the stays $f$ connect the two parts in such a way as to form a rigid unit.

The end of the leg portion of a T-shaped lever or plate $h$ is pivoted at $i$ to a side of the yoke-shaped frame and depending arms or legs $j$ on the said T-shaped levers or plates are adapted to support shackles $k$ to the free ends of which are connected the working ends of quarter elliptic leaf or laminated springs $l$ arranged to exert a downward pressure on the free ends of the said levers or plates.

When the wheel $d$ moves upwardly under the influence of road shock, the levers $h$ pass upwardly on the inside of the fork $a$ and the said levers $h$ are set inwardly as at $h'$ to provide ample clearance inside the said fork.

The opposite ends of the quarter-elliptic leaf springs $l$ are secured by clamps or bolts $m$ to the sides and rear parts of the yoke-shaped frame.

The shackles $k$ can be supported on studs or bolts $n$ projecting laterally from near the bottom of the depending arms of the T-shaped levers or plates and the inner members of the said shackles are adapted to oscillate freely on the studs depending from the arms.

By this arrangement the laminated springs are in duplicate one being on each side of the wheel and they are level with or slightly below the hub of the wheel instead of above the same as heretofore.

An upwardly inclined recess $o$ having a rounded end is formed in the front ends of the levers or plates to take the ends of the axle of the front wheel and the said axle is retained in the recesses by nuts $p$ and washers.

The upwardly projecting arms of the T-shaped levers or the angle portion of the plates are pivotally connected to the bifurcated ends of a rod $q$ which is connected to a piston $r$ adapted to operate in a cylinder $s$ pivotally mounted on lugs $t$ projecting forwardly from the fork in advance of the head of the cycle frame.

The bifurcated end of the rod $q$ connecting the levers to the piston embraces the front wheel and the piston and cylinder act as a dashpot which is designed to retard the upward movement of and to permit of a comparatively free downward movement of the levers.

In lieu of connecting the forward or working ends of the springs $l$ to the levers by means of shackles, they can be slidably supported in recesses or slots formed horizontally in pins or studs $u$ fitted pivotally or rigidly to the said levers.

In operation, when a cycle is passing rapidly over a roadway and the front wheel comes into contact with any inequality therein an upward thrust is imparted to the said wheel with the result that the levers $h$ are caused to pivot at their rear ends and so deflect the springs $l$ upwardly and the piston to move upwardly in the dashpot. The resilient movement of the springs and the cushioning action of the dashpot absorbs all shock or jar and thereby prevents the same being transmitted to the cycle and rider.

I claim.

1. A resilient suspension device for the front wheels of a cycle comprising a yoke shaped member fitted rigidly to the rear of the steering fork, a pair of levers pivotally mounted at one end to the yoke shaped frame, means on the free ends of the levers for supporting the axle of the front wheel of the cycle, a pair of springs mounted rigidly on the yoke shaped frame and exerting a downward thrust on the free ends of the levers, a bifurcated bar connecting the free ends of the levers, a piston on the bifurcated bar, and a cylinder pivoted to the fork and accommodating the said piston.

2. A resilient suspension device for the front wheel of a cycle comprising a pair of levers pivotally mounted at one of their ends to the steering fork of a cycle, jaws in the free ends of the levers for receiving the end of the front wheel of the cycle, a pair of springs fitted to the rigid members supporting the levers and arranged to exert a downward thrust on the free ends of the said levers, a bifurcated bar connected to the free ends of the levers, and a cushioning device fitted to the upper part of the steering fork and with which the upper end of the bar is associated to obviate lateral displacement of the front wheel of the cycle.

3. A resilient suspension device for the front wheel of a cycle comprising a yoke-shaped frame connected rigidly to the steering fork of a cycle frame, a pair of levers pivotally mounted at one of their ends to the side of the yoke shaped frame, means on the free ends of the levers for mounting the axle of the front wheel of the cycle thereon, a pair of leaf springs, having one of their ends secured rigidly to the yoke-shaped frame and their opposite ends movably connected to and exerting a downward pressure on the free ends of the levers, a cushioning device on the upper part of the steering fork, and means for connecting the free ends of the levers to the cushioning devices whereby the levers will move in unison when the leaf springs are deflected.

4. A resilient suspension device for the front wheels of cycles comprising a yoke-shaped member connected rigidly to the rear of the steering fork of a cycle frame, a pair of levers having one of their ends pivotally mounted on the side of the yoke-shaped frame, means for connecting the ends of the axle of the front wheel of the cycle to the free ends of the levers, a pair of leaf springs having their rear ends rigidly secured to the side of the yoke-shaped frame and their front ends movably connected to the free ends of the levers, a cushioning device on the upper part of the steering fork, and a bifurcated bar connecting the free ends of the levers to the cushioning device whereby the said levers will move in unison when the springs are deflected.

5. A resilient suspension device for the front wheels of cycles comprising a yoke-shaped frame connected rigidly to the rear of the steering fork of a cycle frame a pair of T-shaped levers having the ends of their leg portions pivoted to the sides of the yoke shaped frame, recesses in the free ends of the said levers to accommodate the axle of the front wheel, a shackle pivoted to the depending arm of each T-shaped lever, a pair of leaf springs having one of their ends rigidly secured to the yoke-shaped frame and their opposite ends connected to the shackles, a cylinder pivoted to the steering fork, a piston in the cylinder, and a bifurcated rod connecting the upper arms of the T-shaped levers to the said piston.

In testimony whereof I affix my signature.

SAVILLE WHITING.

Witnesses:
J. W. CULLEN,
BERTHA R. CLARKE.